(12) United States Patent
Rieck

(10) Patent No.: US 7,797,805 B2
(45) Date of Patent: Sep. 21, 2010

(54) FORMATION AND ROTATIONAL APPARATUS FOR CYLINDRICAL WORKPIECES

(75) Inventor: Leland M. Rieck, Palo, IA (US)

(73) Assignee: Formtek, Inc., Westfield, MA (US)

( * ) Notice: Subject to any disclaimer, the term of this patent is extended or adjusted under 35 U.S.C. 154(b) by 648 days.

(21) Appl. No.: 11/424,063

(22) Filed: Jun. 14, 2006

(65) Prior Publication Data

US 2006/0283010 A1   Dec. 21, 2006

Related U.S. Application Data

(60) Provisional application No. 60/691,713, filed on Jun. 17, 2005.

(51) Int. Cl.
*B23P 11/00* (2006.01)
*B21D 39/00* (2006.01)

(52) U.S. Cl. .................... 29/33 K; 29/564.7; 72/71; 72/307; 72/368

(58) Field of Classification Search .............. 29/33 K, 29/564.7, 799; 72/70, 71, 112, 118, 125, 72/307, 368
See application file for complete search history.

(56) References Cited

U.S. PATENT DOCUMENTS

| | | |
|---|---|---|
| 606,785 A | 7/1898 | Kemp |
| 2,534,429 A | 12/1950 | Elliott |
| 3,490,137 A | 1/1970 | Buck et al. |
| 3,670,553 A | 6/1972 | Nothum et al. |
| 3,731,513 A | 5/1973 | Kindermann et al. |
| 3,815,394 A | 6/1974 | Walker |
| 3,861,184 A | 1/1975 | Knudson |
| 3,979,809 A | 9/1976 | Schneider |
| 4,210,090 A | 7/1980 | Stubbings |
| 4,693,663 A | 9/1987 | Brenholt et al. |
| 4,806,066 A | 2/1989 | Rhodes et al. |
| 4,913,617 A | 4/1990 | Nicholson |
| 4,921,393 A | 5/1990 | Andeen et al. |
| 4,991,293 A | 2/1991 | Bartholomew |
| 5,014,424 A | 5/1991 | Takasugi |
| 5,090,101 A | 2/1992 | Welty |
| 5,436,423 A | 7/1995 | Welty |
| 5,836,194 A | 11/1998 | Micouleau et al. |
| 6,105,227 A | 8/2000 | Bota |
| 6,363,764 B1 | 4/2002 | Bota |
| 6,378,184 B1 * | 4/2002 | Bota .......................... 29/33 K |
| 6,612,143 B1 | 9/2003 | Butscher et al. |
| 6,732,558 B2 | 5/2004 | Butscher et al. |
| 6,755,064 B2 | 6/2004 | Butscher et al. |

(Continued)

*Primary Examiner*—Rick K Chang
(74) *Attorney, Agent, or Firm*—McCormick, Paulding & Huber LLP

(57) ABSTRACT

A formation and rotation apparatus for use in forming and rotating interconnected sections of a cylindrical workpiece, including a frame and a head arranged within the frame, the head defining two slots and being operatively rotated via an integral drive assembly. A first slide block is slidably disposed within one of the two slots, and a second slide block is disposed within another of the two slots, each of the first and the second slide blocks include a cutting wheel and a beading wheel for successively forming each of the interconnected sections. An armature having an axis of rotation is also provided, along with a gripping mechanism being operatively connected to the armature. A drive mechanism selectively rotates the armature about the axis of rotation after the gripping means has closed about one of the interconnected sections.

5 Claims, 13 Drawing Sheets

U.S. PATENT DOCUMENTS

| | | |
|---|---|---|
| 6,860,132 B2 | 3/2005 | Butscher et al. |
| 7,096,585 B2 | 8/2006 | Bota |
| 2001/0029764 A1 | 10/2001 | Price et al. |
| 2003/0005741 A1 | 1/2003 | Sayler |
| 2005/0028337 A1 | 2/2005 | Bota |
| 2005/0072203 A1 | 4/2005 | Rieck et al. |

* cited by examiner

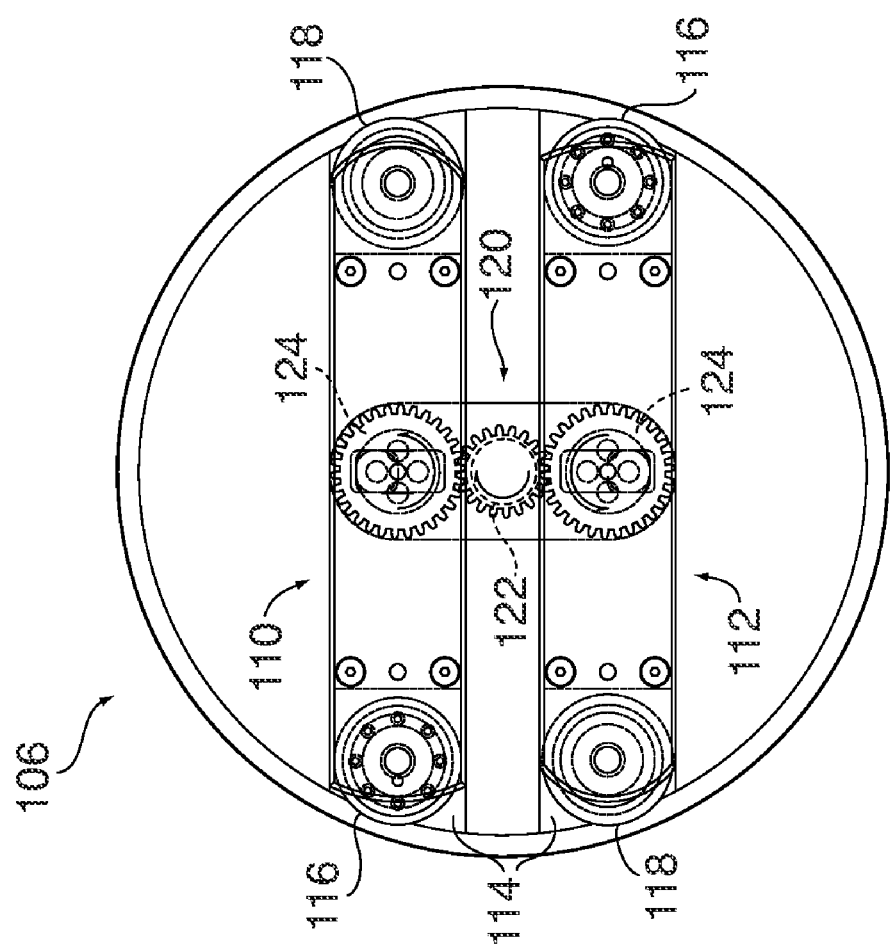
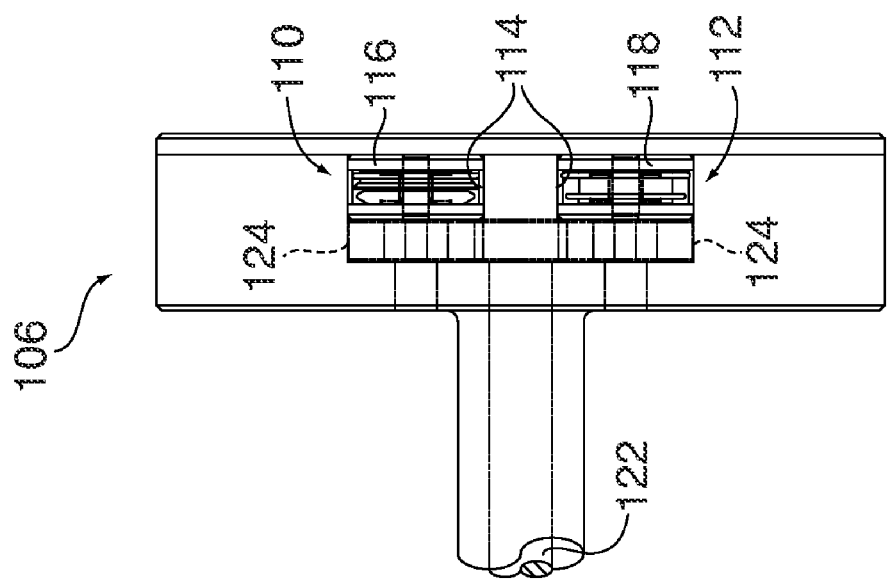

FORMATION AND ROTATIONAL APPARATUS FOR CYLINDRICAL WORKPIECES

CROSS REFERENCE TO RELATED APPLICATIONS

This application claims the benefit of U.S. Provisional Application Ser. No. 60/691,713, filed on Jun. 17, 2005, herein incorporated by reference in its entirety.

FIELD OF THE INVENTION

This invention relates, in general, to a formation and rotation apparatus for use in forming and rotating interconnected sections of a cylindrical workpiece, and deals more particular with a formation and rotation apparatus that will automatically form and turn each section of cylindrical workpiece to its proper orientation even in the cases of large diameter elbow workpieces.

BACKGROUND OF THE INVENTION

Elbow sections of ductwork are typically formed as straight pieces of cylindrical ductwork prior to being manipulated into a finished elbow having a substantial bend attributed thereto. This manipulation has traditionally been accomplished by hand.

While the known hand manipulation of elbow workpieces is effective to a certain degree, such a process is manually difficult and time consuming, as well as oftentimes resulting in the formation of finished elbows having slightly non-uniform characteristics.

Additional complications arise when large diameter elbow workpieces are utilized.

With the forgoing problems and concerns in mind, it is the general object of the present invention to provide a dual head elbow rotator apparatus that will automatically form and rotate large diameter sections of an elbow workpiece to form the finished elbow.

SUMMARY OF THE INVENTION

It is an object of the present invention to provide an elbow rotator that will automatically turn each section of an elbow duct to their proper orientations.

It is another object of the present invention to provide an elbow rotator that will automatically turn each section of an elbow duct to their proper orientations while being incorporated into an elbow formation apparatus.

It is another object of the present invention to provide an elbow rotator that will automatically turn each section of an elbow duct to their proper orientations while serving as a stand-alone apparatus.

It is another object of the present invention to provide an elbow rotator that will simultaneously rotate each integrally formed section of an elbow workpiece.

It is another object of the present invention to provide a dual head elbow rotator apparatus.

It is another object of the present invention to provide a dual head elbow rotator apparatus which can balance the forces incident upon the elbow workpieces during formation.

It is therefore an important aspect of the present invention to propose a formation and rotation apparatus for use in forming and rotating interconnected sections of a cylindrical workpiece, including a frame and a head arranged within the frame, the head defining two slots and being operatively rotated via an integral drive assembly. A first slide block is slidably disposed within one of the two slots, and a second slide block is disposed within another of the two slots, each of the first and the second slide blocks include a cutting wheel and a beading wheel for successively forming each of the interconnected sections. An armature having an axis of rotation is also provided, along with a gripping mechanism being operatively connected to the armature. A drive mechanism selectively rotates the armature about the axis of rotation after the gripping means has closed about one of the interconnected sections.

These and other objectives of the present invention, and their preferred embodiments, shall become clear by consideration of the specification, claims and drawings taken as a whole.

BRIEF DESCRIPTION OF THE DRAWINGS

FIG. 18 illustrates a side view of a dual slide-block head utilized in the dual-slide block cutting and beading apparatus of FIG. 17, in accordance with one embodiment of the present invention.

FIG. 19 illustrates a partial cross-sectional top view of a dual slide-block head shown in FIG. 18.

DETAILED DESCRIPTION OF THE PREFERRED EMBODIMENT

Figure 1:
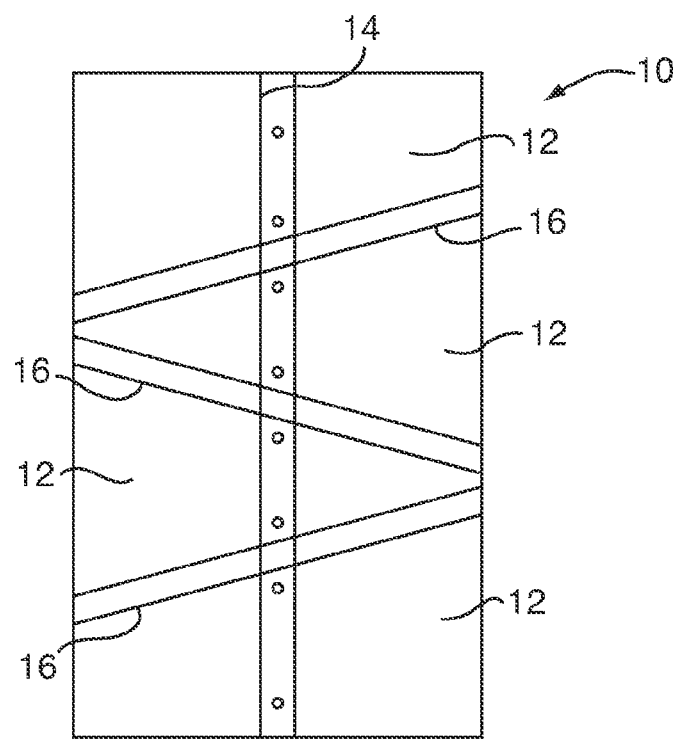
FIG. 1 illustrates a straight elbow section of ductwork, or elbow workpiece, having a plurality of integrally formed sections.

FIG. 1 illustrates a section of an elbow ductwork 10 prior to the elbow 10 being rotated into its final form. As can be seen in FIG. 1, the elbow 10 includes several sections 12 that have been formed by bending a sheet-metal workpiece, or the like, into a cylindrical shape about a common seam 14. Each of the sections 12 are separated from one another by an elbow joint 16 which has been cut and formed in the elbow 10 in a manner well known in the art. As will be appreciated, each of the section 12 of the elbow 10 shown in FIG. 1 must be turned with respect to one another in order to form the finished elbow 18, shown in FIG. 2.

Figure 2:
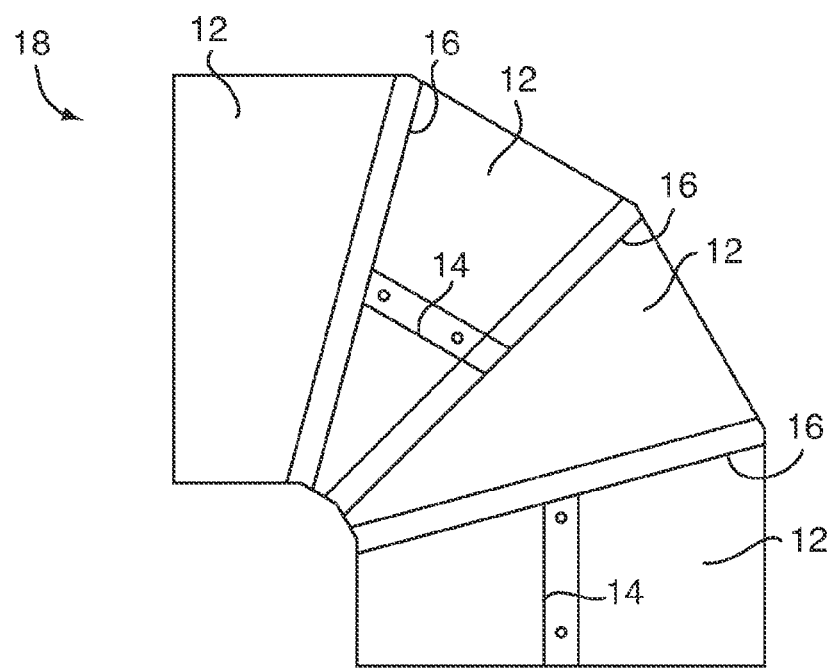
FIG. 2 illustrates a finished elbow section of ductwork.

As illustrated in FIG. 2, and in contrast to the elbow workpiece shown in FIG. 1, the seam 14 is no longer continuous along the length of the finished elbow 18 due to the individual rotation of the sections 12. During rotation, it is typical that each of the sections 12 experience an approximately 180° rotation with respect to adjacent sections in order to provide the 'bend', typically approximately 90°, to the finished elbow (as shown in FIG. 2). The present invention provides a heretofore-unknown apparatus having the ability to automate the rotation of the individual sections 12 of an elbow workpiece.

It should be noted that while a rotation of approximately 180° has been described, other angles of rotation may also be accomplished without departing from the broader aspects of the present invention.

Figure 3:
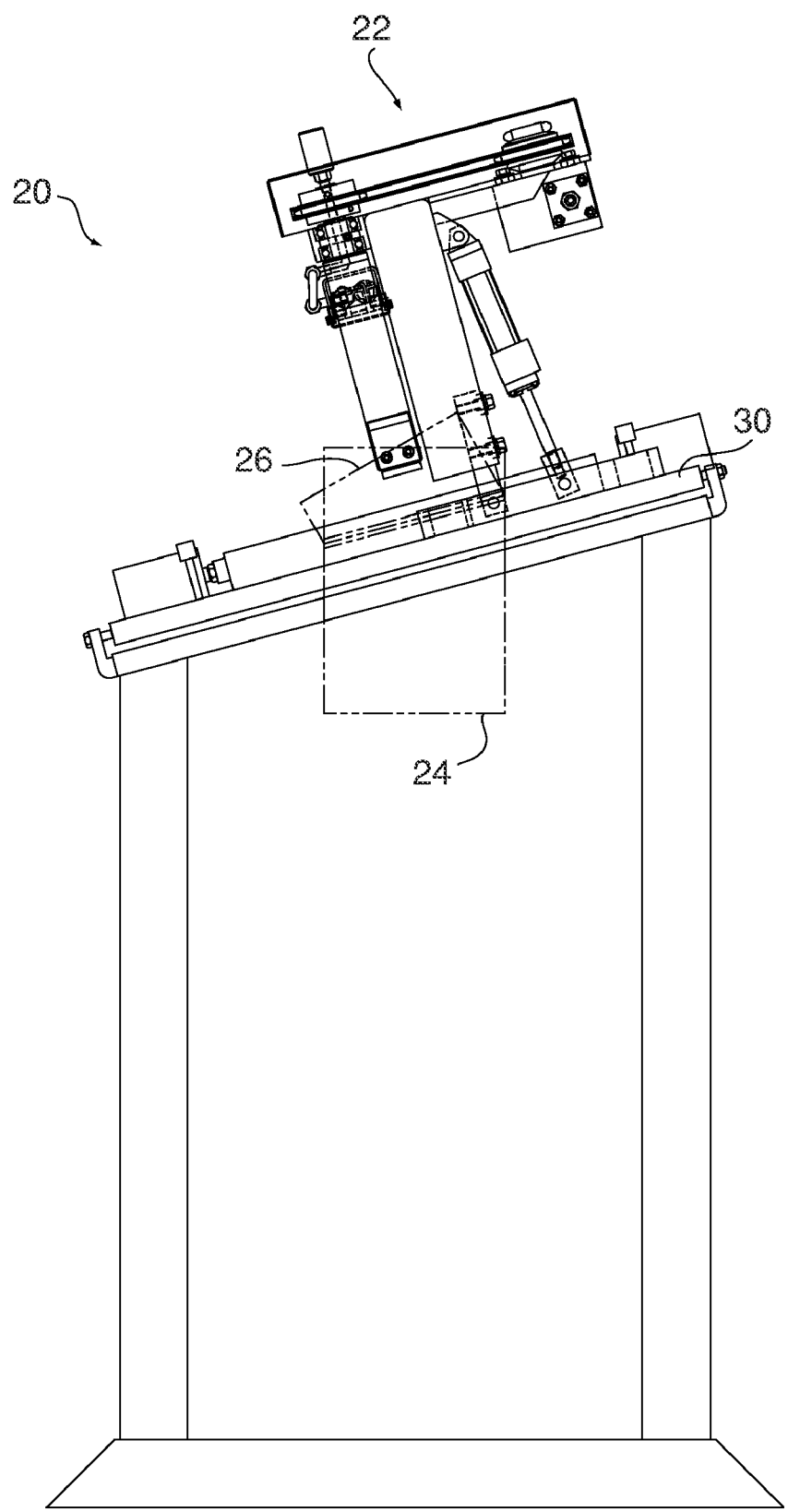
FIG. 3 is partial cross-sectional view of an elbow machine having an elbow rotator, wherein the elbow workpiece is in a first position, according to one embodiment of the present invention.
Figure 4:
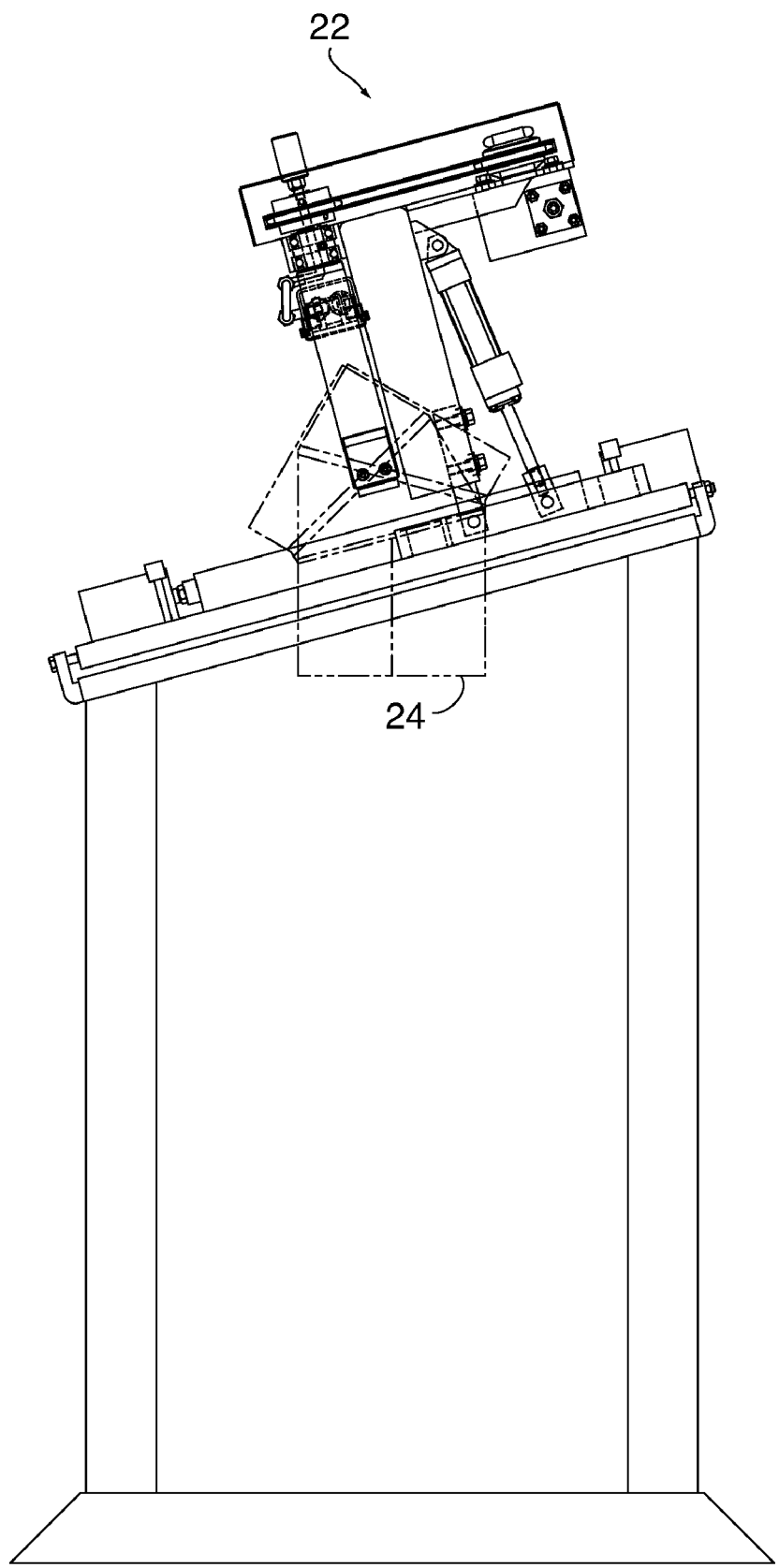
FIG. 4 is partial cross-sectional view of an elbow machine having an elbow rotator, wherein the elbow workpiece is in a second position, according to one embodiment of the present invention.
Figure 5:
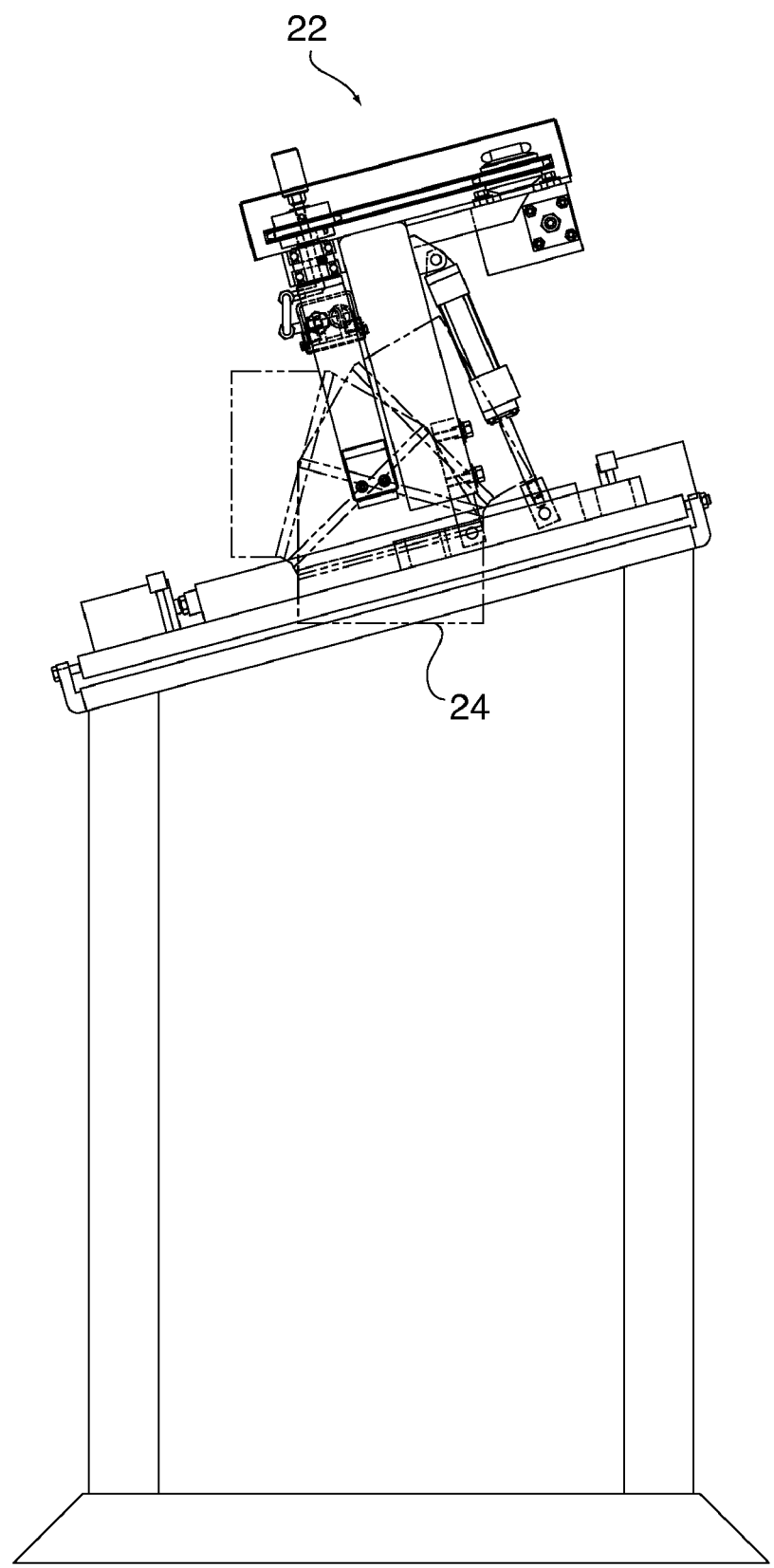
FIG. 5 is partial cross-sectional view of an elbow machine having an elbow rotator, wherein the elbow workpiece is in a finished position, according to one embodiment of the present invention.
Figure 6:
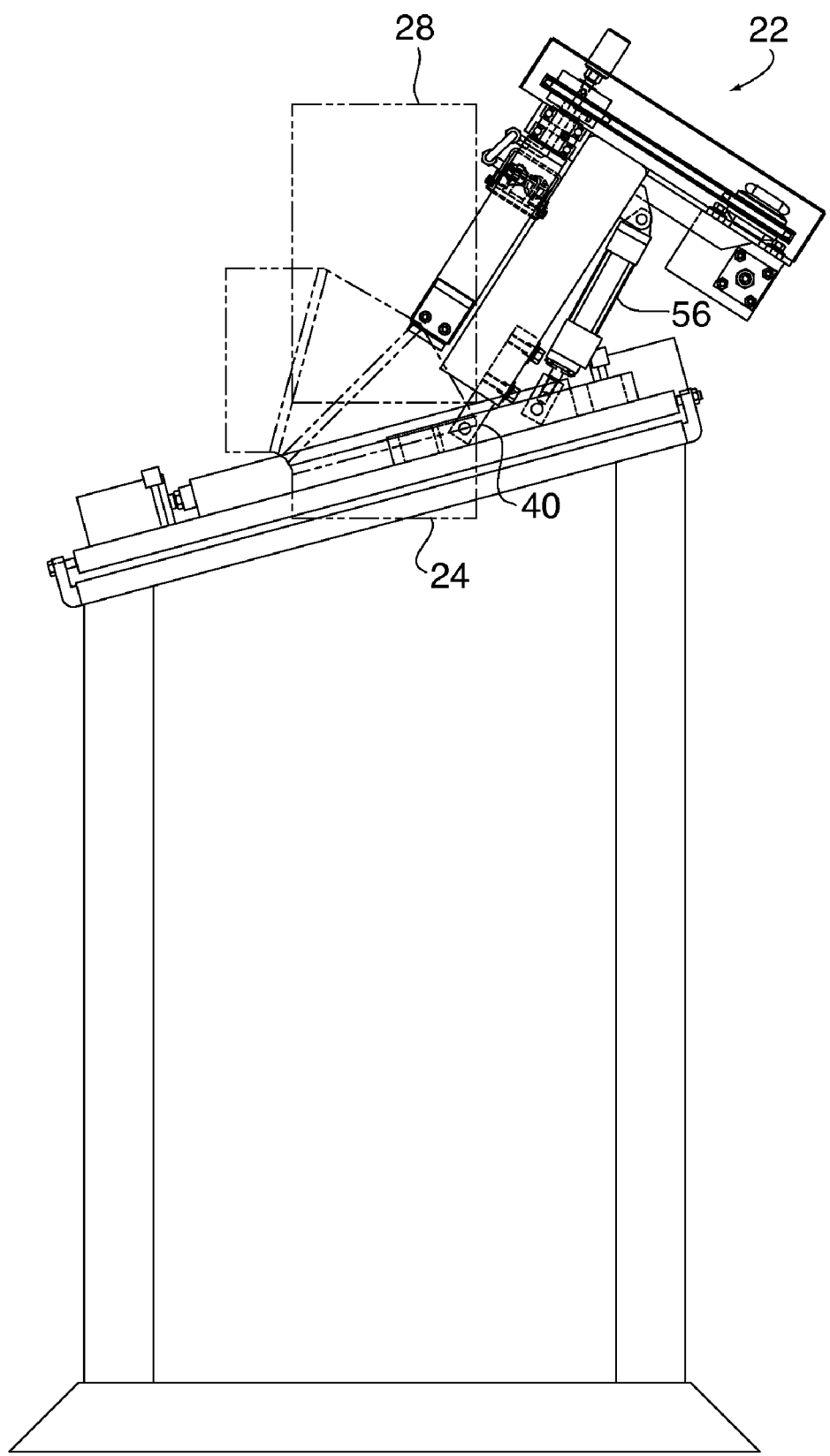
FIG. 6 is partial cross-sectional view of an elbow machine having an elbow rotator, wherein the elbow rotator is tilted back to permit removal of the finished elbow unit, according to one embodiment of the present invention.

FIG. 3 illustrates an elbow machine 20 equipped with an elbow rotator 22 of the present invention. As shown in FIG. 3, an elbow workpiece 24 is mounted within the elbow machine 20 after the elbow workpiece 24 has been formed by the elbow machine 20 in accordance with a known process. A first section 26 of the elbow workpiece 24 is then rotated by the elbow rotator 22, as shown in FIG. 3, in a manner to be explained shortly. FIGS. 4 and 5 illustrate the subsequent rotation, and corresponding re-orientation, of additional sections of the elbow workpiece 24 by the elbow rotator 22. FIG. 6 illustrates the finished elbow workpiece 24 and, in phantom, a new elbow workpiece 28 being mounted for similar processing.

Figure 7:
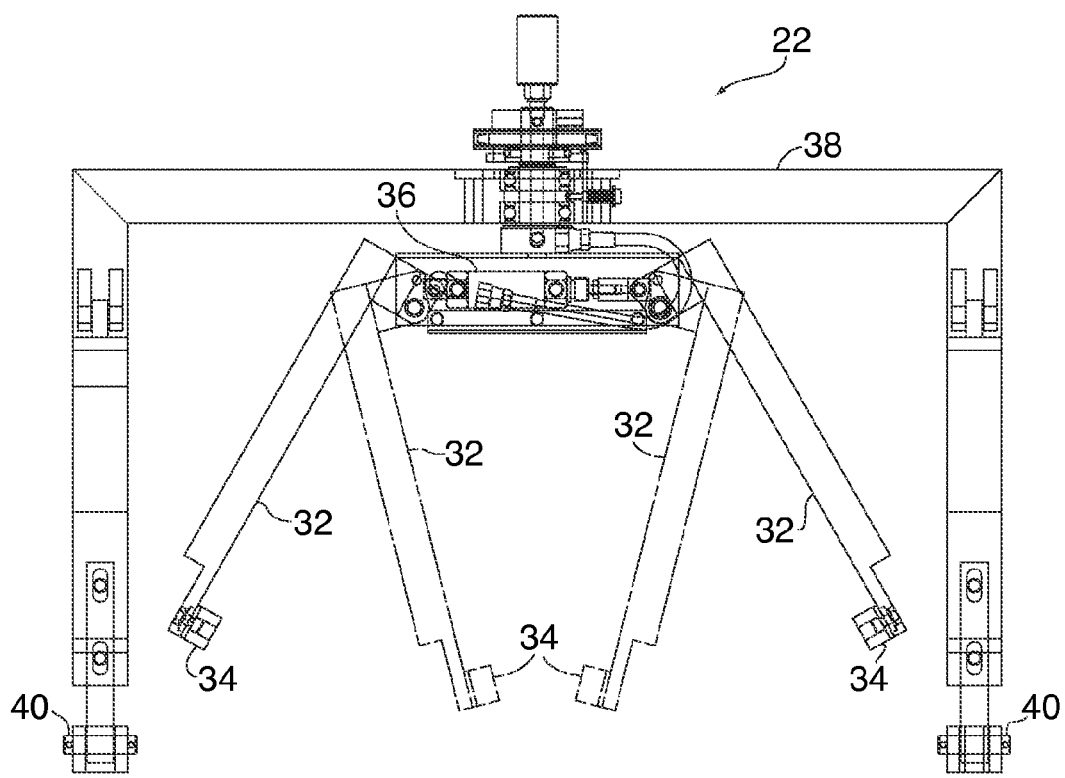
FIG. 7 is a front, partial cross-sectional view of the elbow rotator of the present invention.

The elbow rotator 22 is preferably mounted on an inclined work surface 30 of the elbow machine 20 so as to accept and automatically manipulate each section of the elbow workpiece 24 as each joint of the elbow workpiece 24 is formed by the elbow machine 20. FIG. 7 is a front, partial cross sectional view of the elbow rotator 22. As shown in FIG. 7, the elbow rotator 22 includes a pair of gripping arms 32 having flexible, resilient pads 34 disposed on the ends thereof. A hydraulic cylinder 36, or the like, is utilized to close the gripping arms 32 about a lead section of the elbow workpiece 24. As will be appreciated, the gripping arms 32 will grip the elbow workpiece 24 with a force commensurate with the hydraulic pressure applied to the cylinder 36. Moreover, the cylinder 36 is disposed between the gripping arms 32 and does not control the position of the gripping arms 32, which will center themselves about and on the elbow workpiece 24 as the elbow workpiece is being rotated. As is also shown in FIG. 7, a frame 38 is rotatably mounted on the inclined work surface 30 about pivot joints 40 and substantially supports elbow rotator 22.

It will be readily appreciated that while hydraulic cylinders have been discussed in connection with the present invention, other alternative designs, such as but not limited to pneumatic systems, may be utilized without departing from the broader aspects of the present invention.

Figure 8:
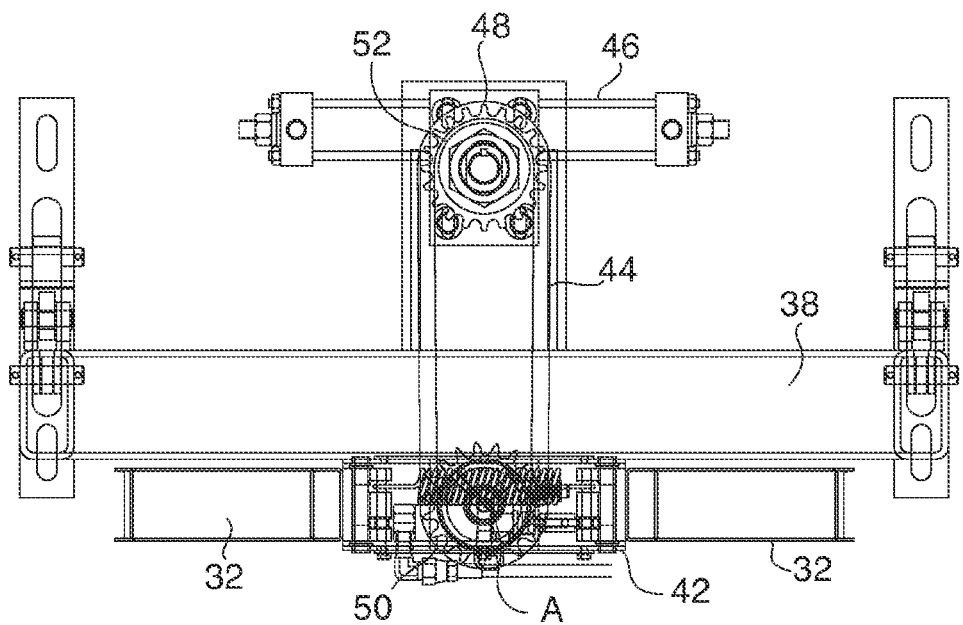
FIG. 8 is a top, partial cross-sectional view of the elbow rotator of the present invention.

FIG. 8 illustrates a top, partial cross-sectional view of the elbow rotator 22. As seen in FIG. 8, the gripping arms 32 are mounted to a gripping frame 42 which selectively pivots about an axis A that is substantially perpendicular to the plane of the joint and is centered on the axis of the joint. The gripping frame 42 is rotated by a roller chain 44 driven by a rotary actuator 46. The rotary actuator 46 will selectively cause the frame 42 and gripping arms 32 to rotate approximately 180°. A sprocket 48 is located on the rotary actuator 46 includes more teeth than a similar sprocket 50 located on the frame 42 in order to provide rotation of more than 180°, should such a rotation be desired. Stroke limiters are utilized on the rotary actuator 46 to adjust the amount of rotation that is produced. Moreover, an adjustable torque limiter 52 is utilized in conjunction with the rotary actuator 46 to limit the available torque that will rotate the elbow workpiece 24.

In operation, each section 12 of the elbow workpiece 24 is sequentially gripped by the gripping arms 32 and rotated approximately 180° under the direction of the rotary actuator 46. After each section 12 of the elbow workpiece 24 has been rotated, the rotary actuator 46 is returned to its home position. The gripper frame 42 rotates back by only the amount over 180° that a given section 12 of the elbow workpiece 24 may have been rotated. In such instances, the gripper frame 42 is stopped by a ratchet and pawl wheel assembly 54 (seen in FIG. 9) at the 180° position, while torque limiter 52 slips to allow the rotary actuator 46 to continue rotating to its home position. In this manner, each successive section 12 of the elbow workpiece 24 may be rotated in the same direction and, moreover, the direction of rotation may be easily reversed by changing the configuration of the ratchet and pawl assembly 54 and reversing the home position of the rotary actuator 46. In this regard, there is a preferred direction to rotate the sections 12 of the elbow workpiece 24 depending on which direction the seam 14 is lapped so that the seam 14 will not catch. In order to achieve proper positioning, it may also be necessary to rotate the first section 12 of the elbow workpiece 24 more than 180°, as the first section 12 of the elbow workpiece 24 may have been slightly rotated during formation of the joints 16.

Figure 9:
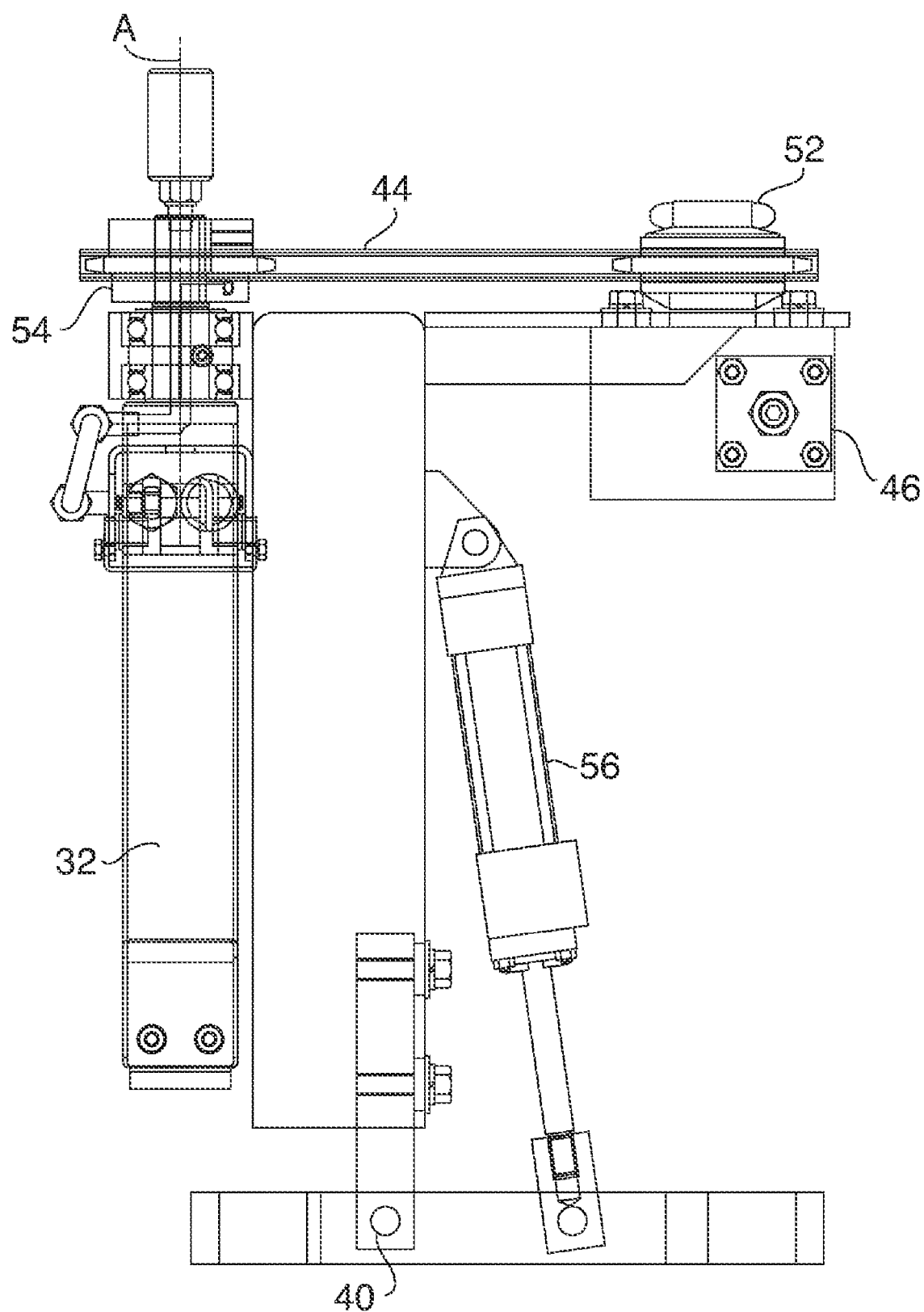
FIG. 9 is a side, partial cross-sectional view of the elbow rotator of the present invention.

FIG. 9 illustrates a side, partial cross-sectional view of the elbow rotator 22. As seen in FIG. 9, the elbow rotator 22 includes a hydraulic positioning cylinder 56 which selectively causes the elbow rotator 22 to pivot about pivot joints 40. Indeed, as best seen with reference to FIGS. 9 and 6, the frame 38 along with the gripping arms 32 and rotary actuator 46 may be selectively tipped back at the conclusion of each elbow production cycle (the position illustrated in FIG. 6) so as to provide enough clearance to remove the finished elbow from the elbow machine 20 and insert the new elbow workpiece 28. The frame 38 would then be tilted back to its operative position to ready for the next elbow production cycle.

It will be readily appreciated that the elbow rotator 22 of the present invention may automatically and sequentially rotate differing sections of a formed elbow workpiece to their proper orientation without the need for manual manipulation of the same. The production of finished elbow units may therefore be substantially increased as compared to manual production methods currently in use. Moreover, given that the elbow rotator 22 resets to a known 'home position' prior to each rotation, and further, that the elbow rotator 22 may even compensate for the slight rotation of the first section of the elbow workpiece, the present invention is capable of repetitively producing finished elbow units having substantially uniform characteristics and mechanical tolerances.

While FIGS. 3-9 illustrate the elbow rotator 22 being integrated with the elbow formation machine 20, the present invention is not limited in this regard. Indeed, the present invention contemplates a free standing elbow rotator apparatus that is not integrated with another device or apparatus, rather it may be a wholly separate unit for accomplishing the same general task as the elbow rotator 22, discussed above.

Figure 10:
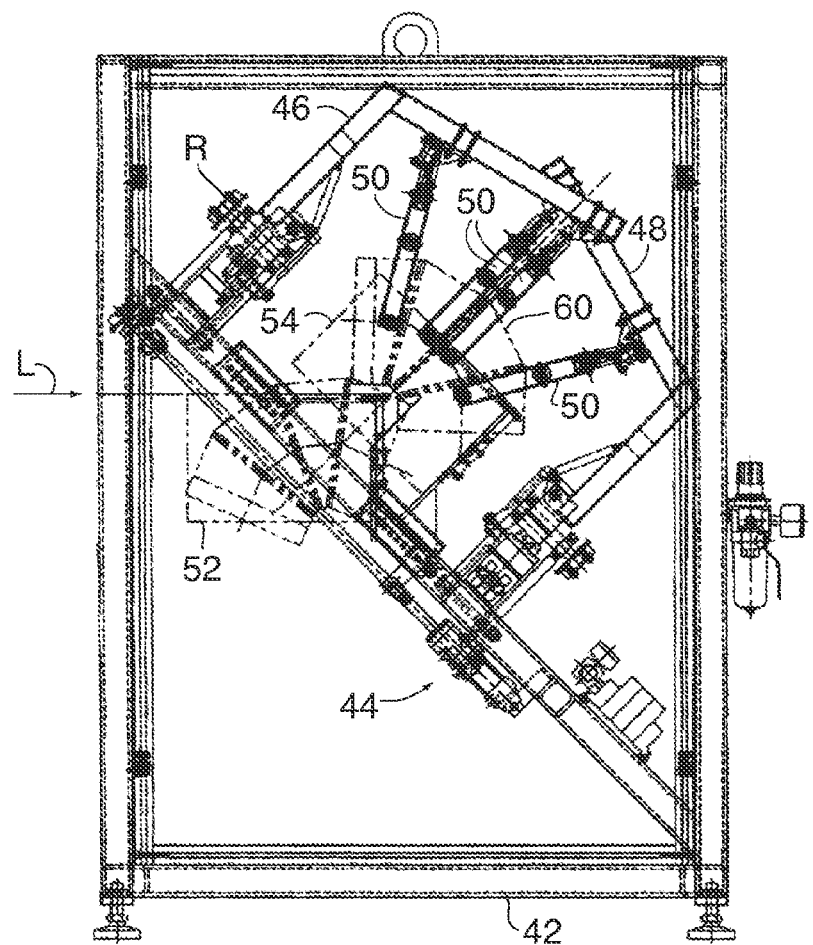
FIG. 10 is partial cross-sectional side view of a freestanding elbow rotator, according to another embodiment of the present invention.

FIG. 10 illustrates a partial cross-sectional side view of a freestanding elbow rotator 40, in accordance with another embodiment of the present invention. As shown in FIG. 10, the freestanding elbow rotator 40 includes a housing 42 and an inclined work surface 44 contained therein.

As discussed previously, adjustable elbows workpieces are initially manufactured as straight tubes having a series of integrated sections. After an elbow machine has finished making the joints in the elbow workpiece, it is still in a straight shape (as seen in FIG. 1). The elbow workpiece must then be rotated into its angled configuration and joined together with other elbows to form a "donut". This donut arrangement is the preferred method of shipping elbows for many manufacturers.

A 90-degree elbow consists of four sections 12, such as shown in FIG. 2. As mentioned previously, each section 12 must be rotated approximately 180 degrees relative to the adjacent sections 12 to position the elbow in its 90-degree shape. There are other elbow configurations that have fewer sections and may result in different angles of the rotated elbow, but all typically require the 180 degree rotation of the adjacent sections in order to produce a finished, or completed, elbow configuration.

Returning to FIG. 10, the freestanding elbow rotator 40 further includes a pair of gripping arms 46 and 48. Each of the gripping arms 46 and 48 support several pairs of gripping fingers 50 and are oriented for selective rotation about rotational axis R. In operation, the gripping fingers 50 of the gripping arms 46 and 48 will selectively secure about each section 12 of the elbow workpiece and rotate them to their finished orientation, as will be described in more detail hereinafter. While the free standing elbow rotator 40 has been described as having several pairs of gripping fingers 50 for each of the gripping arms 46/48, the present invention is not limited in this regard as the gripping arms 46/48 may alternatively support any number of pairs of gripping fingers 50, inclusive of a single pair, without departing from the broader aspects of the present invention.

It is therefore an important aspect of the present invention that one pair of the gripping fingers 50 will rotate each of the sections 12 so that all of the sections 12 can be turned at the same time. In this manner, the freestanding elbow rotator 40 of the present invention serves to significantly reduce the manufacturing time of elbow workpieces, especially as contrasted with the previously known manual rotation of the sections 12 of the elbow workpiece.

As further shown in FIG. 10, and with the gripping arms 46 and 48 in their 'up' position, an operator will load a straight elbow workpiece 52 into the free standing elbow rotator 40, from the front and substantially in a direction L. The straight elbow workpiece 52 is preferably loaded so as to ensure that the seam 14 is up and the crimped end out.

Figure 11:
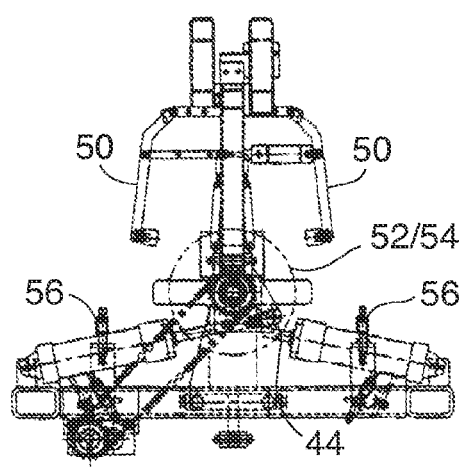
FIG. 11 is a partial cross-sectional end view of a gripping arm of the freestanding elbow rotator in its 'up' position.

Once a start button is pushed, the straight elbow workpiece 52 is swung up to re-position the straight elbow workpiece 52 at a second, inclined position 54 within the free standing elbow rotator 40. Thus, the longitudinal axis of the straight elbow workpiece 52/54 will be arranged to be substantially parallel to, and preferably concentrically aligned with, the rotational axis R of the gripping arms 46 and 48. FIG. 11 is a partial cross-sectional view of the straight elbow workpiece 52/54 as it is arranged within the free standing elbow rotator 40 with the gripping arms 46 and 48, and gripping fingers 50, in their 'up' position.

A cam and roller arrangement permits each of the gripping arms 46 and 48 to pivot as they rotate down. As each of the gripping arms 46 and 48 reach their 'down' position, each of the gripping fingers 50 will contact an adjustable stop 56 to arrest each of the gripping fingers 50 in the proper starting position to grip the sections 12. The stops 56 are manually adjustable to produce the correct amount of rotation to each of the sections 12.

Figure 12:
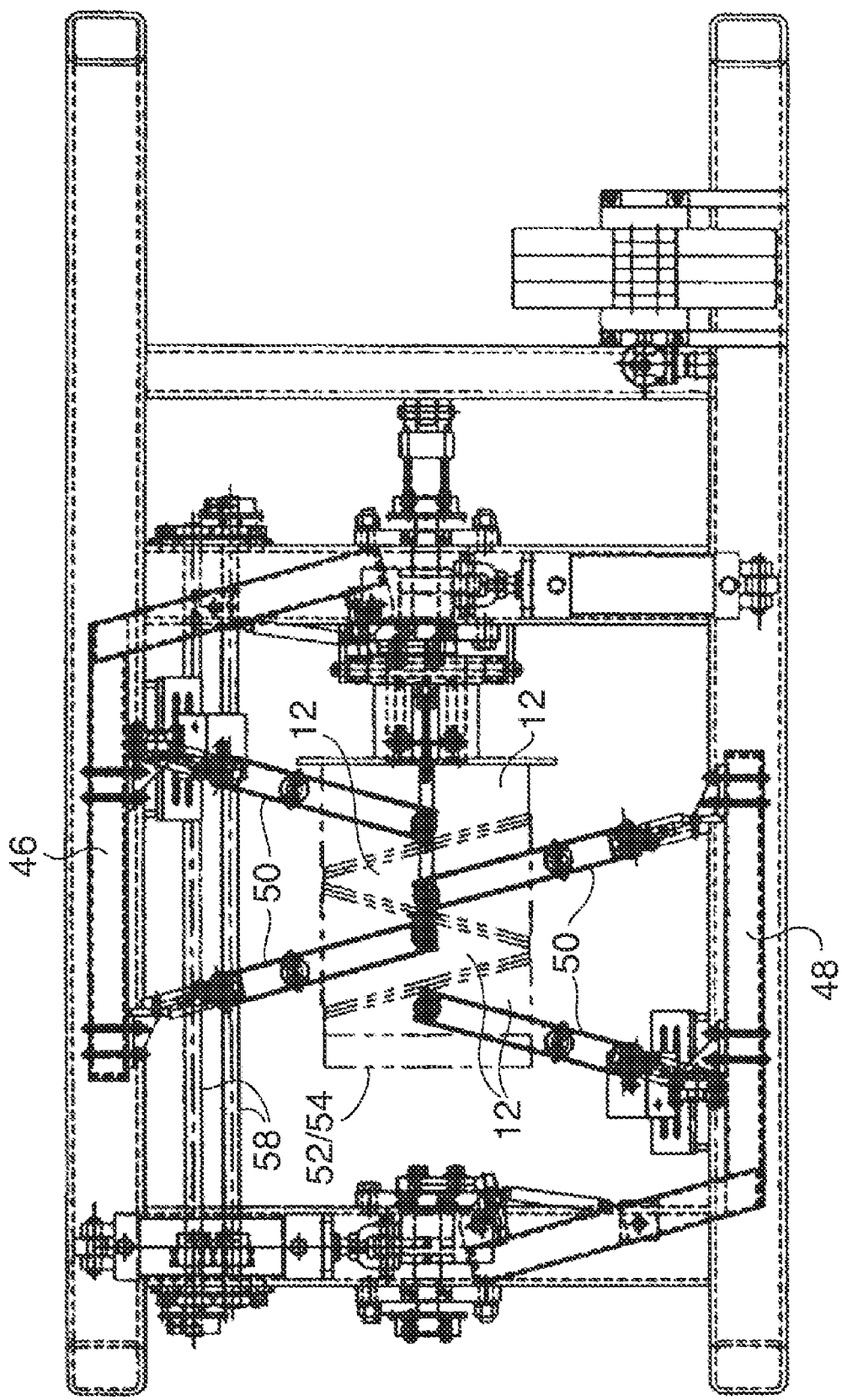
FIG. 12 is a partial cross-sectional top view of the gripping arms of the free standing elbow rotator in their 'down' position and secured about their respective sections of the elbow workpiece.

With the gripping arms 46 and 48 in their 'down' position, the gripping arms 50 are caused to close about each section 12 of the elbow workpiece 52/54. As shown in FIG. 12, the gripping fingers 50 of adjacent sections 12 are connected to gripping arms 46 and 48. That is, on a four-section elbow workpiece, the first and third section gripping fingers 50 are mounted on one gripping arm, and the second and fourth section gripping fingers 50 are mounted on the other gripping arm. FIG. 12 illustrates the free standing elbow rotator 40 when the gripping arms 46 and 48 are in their 'down' position, and the gripping fingers 50 are each secured about their respective sections 12 of the elbow workpiece 52/54.

Figure 13:
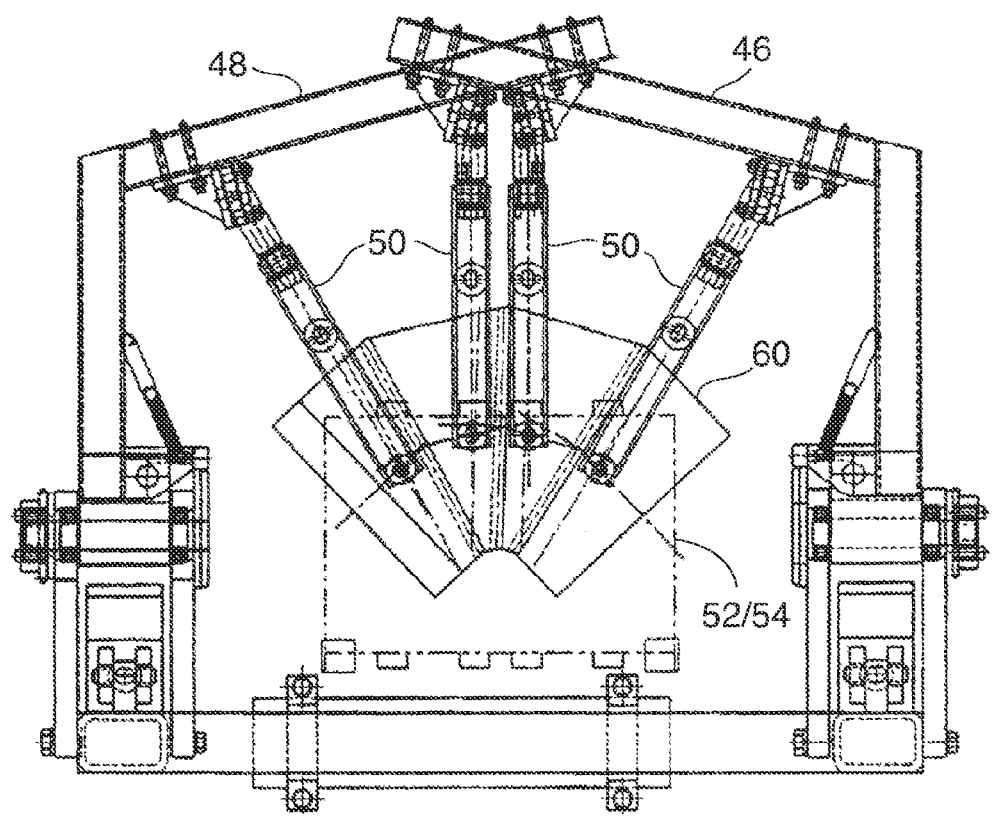
FIG. 13 is a partial cross-sectional side view of the gripping arms of the free standing elbow rotator after rotation back to their 'up' position, thereby forming a completed elbow.

After gripping each of the sections 12, one gripping arm rotates 90 degrees clockwise while the other gripping arm rotates approximately 90 degrees counterclockwise. As the arms rotate, they swing out approximately 15 degrees to follow the arching movement of the elbow workpiece 52/54. Each set of the gripping fingers 50 is mounted to the gripping arms 46 and 48 by a pivoted joint so the gripping fingers 50 may twist with the elbow workpiece 52/54 as it is rotated. The rotations of the two gripping arms 46/48 are synchronized by a chain and sprocket assembly and operatively connected to two shafts 58 that are geared together, as shown in FIG. 12. The rotation of the gripping arms 46 and 48 thereby causes the individual sections 12 of the elbow workpiece 52/54 to rotate to their final position and thus define a completed elbow 60. FIG. 13 illustrates a side, partial cross-sectional view of the completed elbow workpiece 60 once the gripping arms 50 have completed their upwards rotation.

Once the gripping arms 46 and 48 have been fully rotated to occupy once again their 'up' position, as shown in FIG. 13, the gripping fingers 50 release the completed elbow 60. The completed elbow 60 is then pivoted, in opposition to the direction in which it was initially loaded, for subsequent removal from the housing 42 of the freestanding elbow rotator 40.

Figure 14:
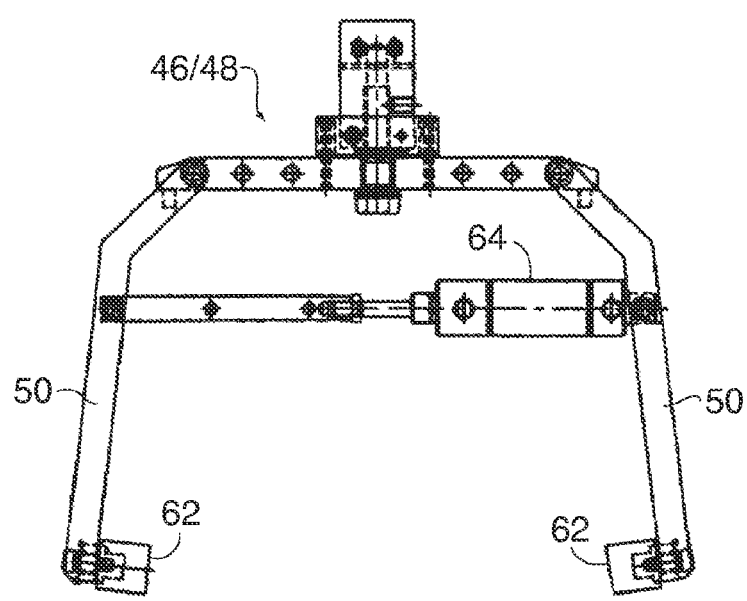
FIG. 14 is a partial cross-sectional end view of a gripping arm of the freestanding elbow rotator.

FIG. 14 illustrates an end view of one set of the gripping fingers 50 attached to one of the gripping arms 46/48. As shown in FIG. 14, the distal ends of the gripping fingers are each equipped with a resilient and elastic cushioning bumper 62, such as but not limited to a urethane bumper or the like, for protecting the body of the elbow workpiece 52/54 during operation of the free standing elbow rotator 40. A pneumatic cylinder 64, or the like, is utilized to selective cause the gripping fingers 50 to alternatively expand and constrict about the body of the elbow workpiece 52/54.

Figure 15A:
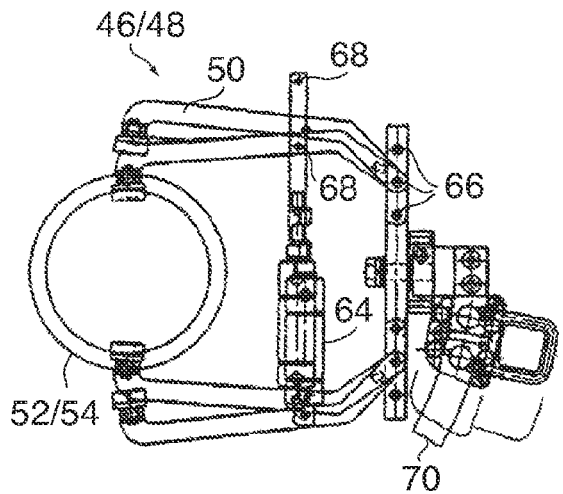
FIG. 15 illustrate the gripping arm of FIG. 14 as it accommodates elbow workpieces of differing diameters.
Figure 15B:
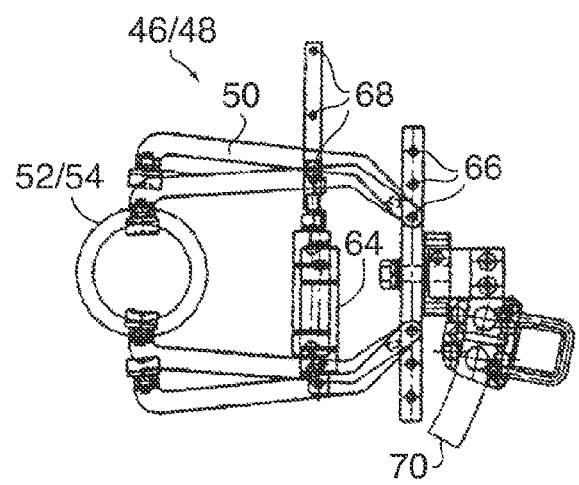
Figure 16:
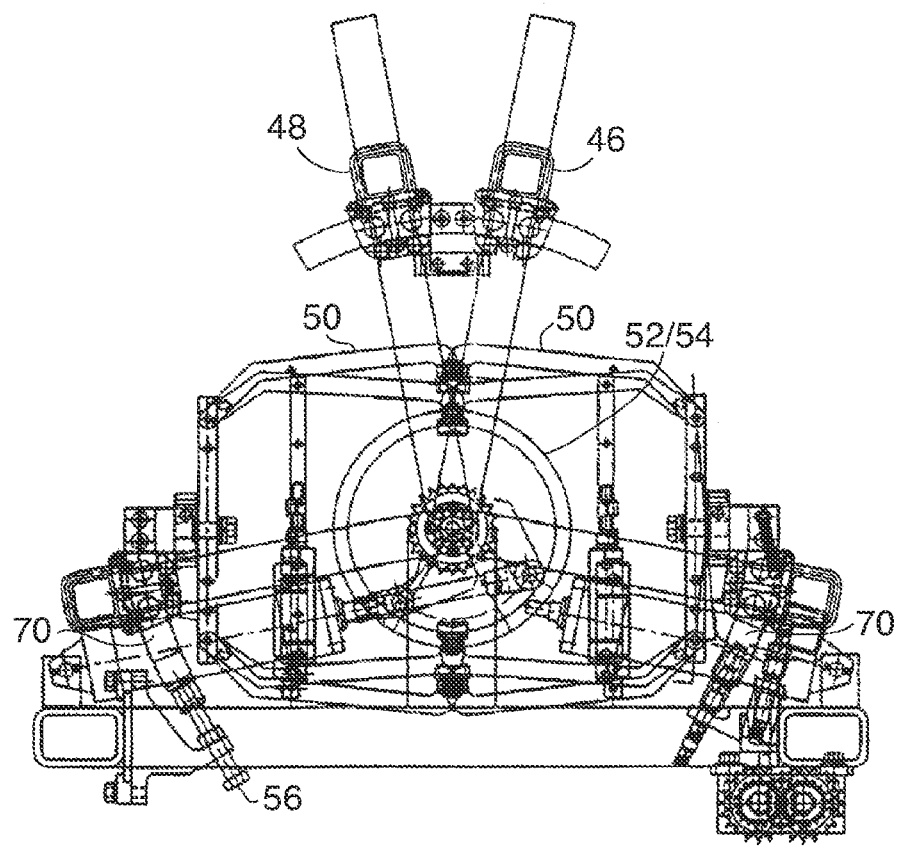
FIG. 16 is a partial cross-sectional end view of the gripping arms of the free standing elbow rotator in both its 'up' and 'down' positions.

Moreover, as shown in FIG. 15, the gripping fingers 50 of the gripping arms 46/48 may be selectively configured to match elbow workpieces 52/54 of differing diameters. That is, by changing the attachment points 66 of the gripping fingers 50 on the gripping arm 46/48, as well as by changing the attachment points 68 of the gripping fingers 50 to the cylinder 64 itself, it is thus possible to accurately accommodate elbow workpieces 52/54 of differing diameters. As discussed hereinafter, at least one of the gripping arms 46/48 also includes a sliding bar 70 which may be selectively positioned, via friction bolts or the like, to extend a predetermined distance, thus selectively abutting adjustable stop 56 and arresting thereby the rotation of the gripping arms 46/48 during its downward rotation, as illustrated in FIG. 16.

It will be readily appreciated that when the elbow joints 16 (shown in FIG. 1) are formed in an elbow machine, the sections 12 are usually rotated slightly out of alignment with respect to one another. Each section 12 must therefore be rotated a different amount to have the proper alignment at the end of the rotation. As discussed above, the present invention envisions that one pair of gripping fingers 50 on each gripping arm 46/48 is mounted on a sliding bar 70 so that it may be stopped before the gripping arm 46/48 is fully rotated down. When the gripping arm 46/48 is rotated down, it is stopped at a different starting position to match the starting position of its respective elbow section 12. The gripping arm 50 is therefore stopped at the position for the sliding gripping fingers 50 to match the starting position of its respective elbow section 12. As the gripping arm 46/48 rotates up, only those sections 12 gripped by the fixed gripping fingers 50 are initially rotated, until the gripping arm 46/48 reaches the position that the sliding gripping fingers 50 was stopped. As the rotation continues, the sliding gripping fingers 50, along with the fixed gripping fingers 50, now also rotate their respective sections 12 through the rest of the rotation. At the end of the arm rotation each section 12 is therefore in its proper, final position.

It will therefore be appreciated that the present invention provides a rotator for elbow workpieces which automatically performs the rotation of respective sections of the elbow workpiece, thereby automating what has traditionally been a laborious, difficult and time consuming process. Moreover, the present invention has envisioned that the elbow rotator may be provided in conjunction with an elbow forming machine, thus rotating each section of the elbow workpiece as it is formed, or alternatively, that a free standing elbow rotator may be utilized for simultaneously accomplishing rotation of all of the sections of an elbow workpiece after it has been formed.

Figure 17:
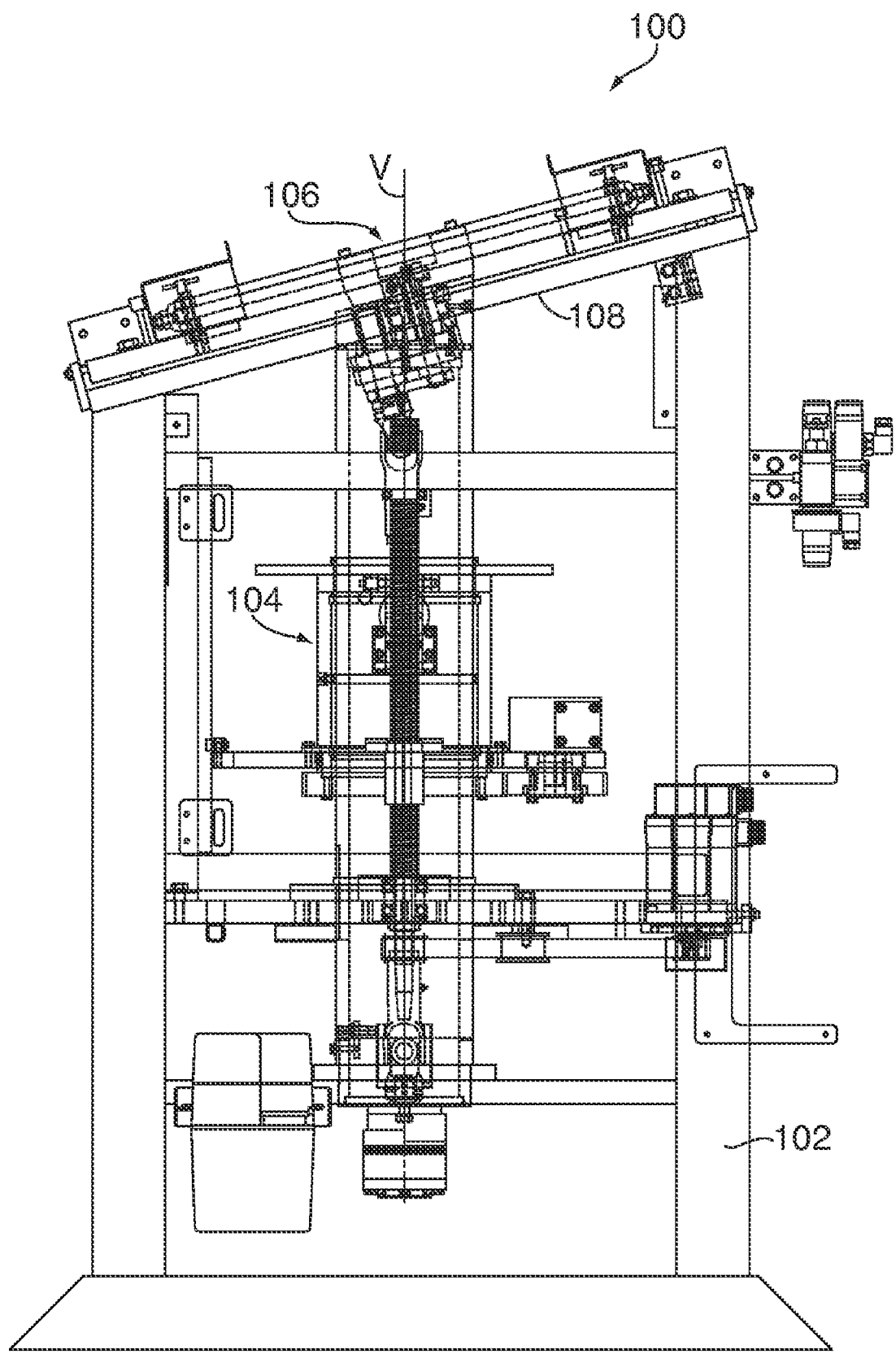
FIG. 17 illustrates a dual-slide block cutting and beading apparatus, in accordance with another embodiment of the present invention.

While rotation apparatuses for automatically rotating interconnected sections of pre-formed cylindrical workpieces has been described in connection with FIGS. 1-16, another embodiment of the present invention involves the utilization of dual cut and bead slide blocks, as depicted in FIGS. 17-19.

Prior art elbow formation methods rely upon the manual manufacture of elbow sections for large diameter workpieces. Indeed, for workpieces larger than approximately 18", each section of the elbow must be made separately and manually, and then manually joined together to form the finished elbow section of duct. Thus, the manipulation of larger-diameter cylindrical workpieces during the formation of the interconnected sections is oftentimes cumbersome, owing to the increased diameter of the workpiece, and must be preformed manually.

In general, and as discussed previously in conjunction with FIGS. 1-16, automatic elbow machines process straight tubes, that is, cylindrical workpieces, into segmented adjustable elbows. A cylindrical workpiece is inserted into the elbow machine around a center arbor and is clamped in a set of dies around the outside diameter. These known apparatuses utilize a revolving head mounted on top of the center arbor. A single slide block is mounted in a slot in the head, and rotates with the head. This single slide block is used to cut and form the interlocking elbow joints or sections. As known in the art, the slide block typically has a cutting wheel disposed at one distal end and a beading wheel disposed at the other distal end. As the revolving head rotates, the slide block is extended out in one direction to cut through the tube and then out in the other direction to bead the sections together.

When the slide block is extended out in either working position, the head is unbalanced, and this is only more of a concern on larger-diameter workpieces where the single slide block is inherently longer and heavier. That is, as the cutting and/or beading wheels are working the material, the cylindrical workpiece is pulled toward the slide where the slide block is either cutting or forming the material of the workpiece. Thus, the performance of known single-slide block forming apparatuses oftentimes suffers accordingly.

The present invention therefore proposes using a head having two identical and complimentary slide blocks, in order to better balance the forces exerted upon the workpiece during cutting and bead-formation operation. FIG. 17 illustrates a side view of a dual-slide block cutting and beading apparatus 100, according to one embodiment of the present invention. The dual-slide block cutting and beading apparatus 100 includes a frame 102, within which is supported an elevating assembly 104 for selectively moving a cylindrical workpiece along a vertical axis V. A dual slide-block head 106 is arranged adjacent an inclined work surface 108 of the frame 102, and operates in the manner to be discussed hereafter to cut and form interconnected section of the cylindrical workpiece.

It will be readily appreciated that the frame 102 and the elevating assembly 104 of the dual-slide block cutting and beading apparatus 100 perform substantially akin to those devices already known in the art, and so further detailed discussion as to their specific components and operation will be committed to the knowledge of those of such skill in the art. Suffice to say that the elevating assembly 104 may accept and index a portion of a cylindrical workpiece disposed within the dual-slide block cutting and beading apparatus 100, so as to present the cylindrical workpiece to the dual slide-block head 106 of the present invention.

FIGS. 18 and 19 illustrate a side and a partial cross-sectional top view, respectively, of the dual slide-block head 106, in accordance with one embodiment of the present invention. As shown in FIGS. 18 and 19, the dual slide-block head 106 includes a first and a second slide blocks, 110 and 112, disposed within matching slots 114 of the head 106.

Each of the slide blocks 110 and 112 will have a cutting wheel 116 disposed at one distal end, and a beading wheel 118 disposed at the other distal end thereof. The slide blocks 110 and 112 are mounted side by side in the head 106 and are positioned adjacent the inclined work surface 108. As best shown in FIG. 19, the slide blocks 110 and 112 will be oriented such that the cutting wheel-end 116 (and the beading wheel-end 118) of each slide block is disposed on opposite sides of the head.

That is, it is an important aspect of the present invention that the cutting wheel 116 of the first slide block 110 is oriented such that it is disposed on one lateral side of a drive gear assembly 120, while the cutting wheel 116 of the second slide block 112 is disposed on the other lateral side of the drive gear assembly 120. The beading wheel of the slide blocks 110 and 112 are also disposed on alternate lateral sides of the drive gear assembly 120, as shown in FIG. 19.

With the configuration as shown in FIG. 19, the dual slide-block head 106 effectively balances the forces incident upon a cylindrical workpiece as the slide blocks 110 and 112 are extended in opposite directions to cut and to bead the material of the cylindrical workpiece. A drive shaft 122 is located in the center of the dual slide-block head 106 and operates the drive gear assembly 120 in order to selectively drive matching gears 124 under each of the slide blocks 110 and 112. The gears 124 located under the slide blocks 110 and 112 will have a pin that is located at a distance from the center that will drive the slide blocks 110 and 112 back and forth in the head as it turns, thus alternatively forming both a cut in the material of the cylindrical workpiece, and also the bead that retains on cut portion to another, in a manner well known in the art.

As discussed generally above, using the two slide blocks 110 and 112 moving in opposite directions will keep the head 106 balanced and will contact the cylindrical workpiece on opposing sides to keep the cylindrical workpiece centered. Each wheel 116 and 118 of each of the slide blocks 110 and 112 will be doing half of the cutting or forming work, so each slide block 110 and 112 can therefore be extended and retracted faster to reduce the overall cycle time. Moreover, it has been discovered that he head 106 can also be rotated faster with the balanced weight of the two slide blocks 110 and 112 extended on opposite sides. In the end, a cut and seamed cylindrical workpiece, such as shown in FIG. 1, may be produced in less time, and with greater mechanical precision and within greater tolerances than would otherwise be capable with the known single-slide block heads typically employed in such machines.

Thus, the dual head elbow rotator apparatus shown in FIGS. 17-19 not only permits the automated manufacture of elbow sections of duct from a straight workpiece, but does so in a manner that balances the forces incident upon the workpiece during the formation process. In this manner, the manipulation of larger diameter cylindrical workpieces may be automated, while also meeting more exacting mechanical specifications.

Still further, the dual slide block head 106 of of the dual-slide block cutting and beading apparatus 100 produces less vibration, thus resulting in a reduced chance of producing slivers, as well as producing a faster cut and reduced total cycle time.

Still yet another embodiment of the present invention resides in equipping a elbow rotator apparatus that includes four (4) or more opposing cutting and beading slide blocks, preferably disposed every 90°, or the like.

It will of course be recognized that the automatic rotational assemblies described in connection with FIGS. 3-16 may be stand-alone devices, or may be advantageously combined with the dual slide block apparatuses discussed in connection with FIGS. 17-19. When so combined, the resultant assembly may quickly and efficiently form the interconnected sections of a cylindrical workpiece, while subsequently rotating these interconnected sections so as to form a desired configuration, such as an elbow configuration.

While the invention has been described with reference to the preferred embodiments, it will be understood by those skilled in the art that various obvious changes may be made, and equivalents may be substituted for elements thereof, without departing from the essential scope of the present invention. Therefore, it is intended that the invention not be limited to the particular embodiments disclosed, but that the invention includes all embodiments falling within the scope of the appended claims.

What is claimed is:

1. A dual slide block cutting and bead forming apparatus for use in defining interconnected sections of a cylindrical workpiece, said dual slide block cutting and bead forming apparatus comprising:
   a head operatively rotated via an integral drive assembly, said head defining two slots therein;
   a first slide block slidably disposed within one of said two slots;
   a second slide block disposed within another of said two slots; and
   wherein each of said first and said second slide blocks include a cutting wheel and a beading wheel.

2. The dual slide block cutting and bead forming apparatus according to claim 1, wherein:
   said first and said second slide blocks are oriented approximately parallel to one another, and are driven by a common drive gear of said integral drive assembly.

3. The dual slide block cutting and bead forming apparatus according to claim 1, wherein:
   said cutting wheel and said beading wheel are disposed on opposing distal ends of said first and said second slide blocks.

4. The dual slide block cutting and bead forming apparatus according to claim 3, wherein:
   said first and said second slide blocks are driven by a common drive gear of said integral drive assembly; and
   said cutting wheel of said first slide block and said cutting wheel of said second slide block are on opposing lateral sides of said common drive gear.

5. A formation and rotation apparatus for use in forming and rotating interconnected sections of a cylindrical workpiece, said formation and rotation apparatus comprising:
   a frame;
   a head Arranged within said frame and operatively rotated via an integral drive assembly, said head defining two slots therein;
   a first slide block slidably disposed within one of said two slots;
   a second slide block disposed within another of said two slots, each of said first and said second slide blocks include a cutting wheel and a beading wheel;
   an armature operatively connected to said frame and having an axis of rotation;
   a gripping means being operatively connected to said armature; and
   a drive means for selectively rotating said armature about said axis of rotation after said gripping means has closed about one of said sections.

* * * * *